P. R. HINKLE.
NUT LOCK.
APPLICATION FILED NOV. 30, 1909.

969,693.

Patented Sept. 6, 1910.

P. R. Hinkle, Inventor,

Witnesses
Howard D. Orr.
George Tate.

By E. G. Siggers
Attorney

THE NORRIS PETERS CO., WASHINGTON, D. C.

UNITED STATES PATENT OFFICE.

PARIS R. HINKLE, OF MONTEREY, CALIFORNIA.

NUT-LOCK.

969,693.  Specification of Letters Patent.  Patented Sept. 6, 1910.

Application filed November 30, 1909. Serial No. 530,665.

*To all whom it may concern:*

Be it known that I, PARIS R. HINKLE, citizen of the United States, residing at Monterey, in the county of Monterey and State of California, have invented a new and useful Nut-Lock, of which the following is a specification.

This invention relates to improvements in nut-locks and has for its object to provide a simple, inexpensive one of great strength and durability, adapted to be readily applied to an ordinary bolt and nut without necessitating any alteration in the construction thereof and capable of effectively preventing a nut from accidentally unscrewing when subjected to vibration and rattling incident to its use on rail-joints, machinery, and the like.

With these and other objects in view, the invention consists in the construction and novel combination of parts hereinafter fully described, illustrated in the accompanying drawing, and pointed out in the claims hereto appended; it being understood that various changes in the form, proportion, size, and minor details of construction, within the scope of the claims, may be resorted to without departing from the spirit or sacrificing any of the advantages of the invention.

Figure 1:
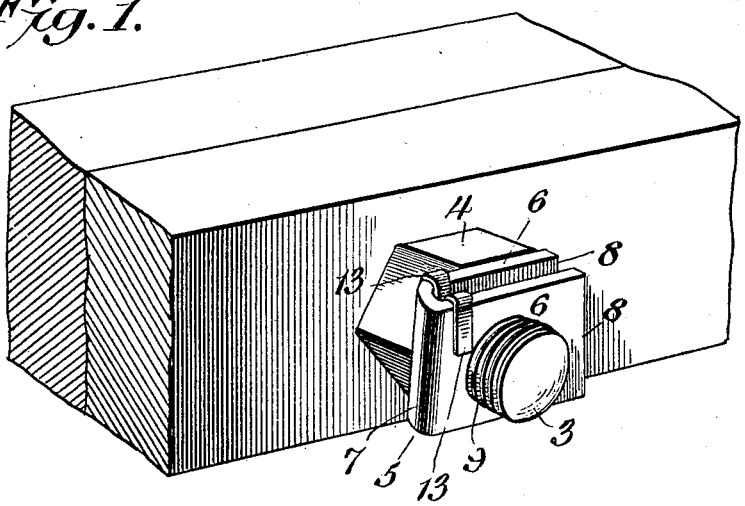
Figure 2:
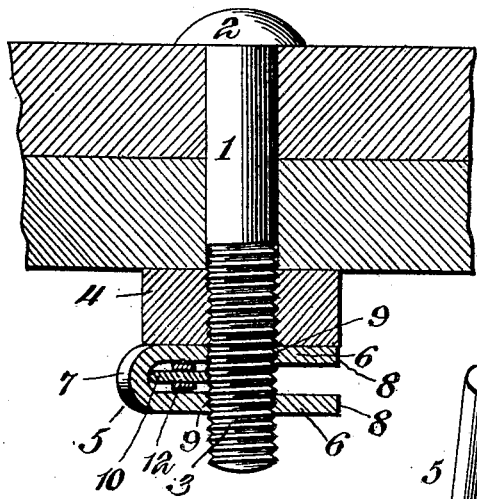
Figure 3:
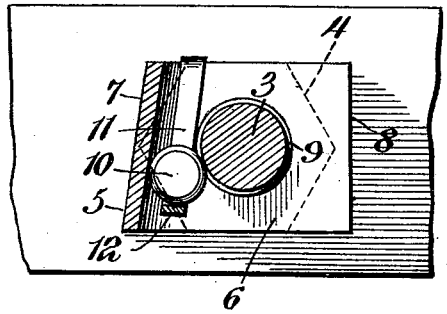
Figure 4:
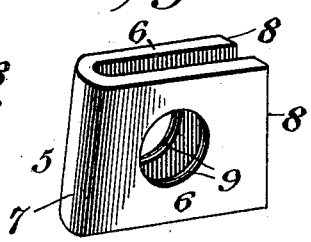
Figure 5:
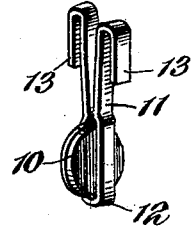

In the drawing:—Figure 1 is a perspective view showing the nut locked in operative position. Fig. 2 is a horizontal sectional view through the lock and the bolt. Fig. 3 is a vertical transverse section through the plate and bolt. Fig. 4 is a perspective view of the plate, and Fig. 5 is a perspective view of the disk and its holder.

Like reference numerals designate corresponding parts in all the figures of the drawing.

The numeral 1 designates a bolt of any preferred form and having a head 2 and a screw-threaded shank 3. A common form of nut 4 is adapted to be threaded onto the said shank. The nut-lock comprises a plate 5, of suitable metal doubled upon itself to form opposite spaced legs 6—6 in the shape of a letter U. The bend or connecting portion 7 of the legs 6—6 is arranged at an inclination with respect to the free ends 8—8 of the said legs, as clearly shown in Fig. 3. The legs are provided with circular and internally threaded openings 9—9, which are arranged in alinement, and adapted to be threaded onto the bolt 1.

The invention further comprises a disk 10 of suitable hard metal having a diameter somewhat greater than the distance between the opening 9 and the connecting portion 7 of the U-shaped plate, and a thickness to fit between any two of the threads. A thin strip 11 of flexible metal constituting a holder, is doubled upon itself to form a loop 12 which is adapted to snugly embrace the disk 10, the width, however, of the said strip being much less than the diameter of the said disk.

In operation, after the nut 4 has been screwed home, the plate 5 is threaded onto the bolt to a position near the said nut 4. The disk 10 is arranged within the looped portion 12 of the strip 11, and the said strip is inserted between the legs of the plate 5 from the underside and between the connecting portion 7 thereof and the shank 3. The flexible strip is of such a length that when the disk 10 has been brought up into close engagement with the shank 3 and between the threads (Fig. 2), the free ends 13—13 of the said strip will extend beyond the outer or upper edge of the plate 5. The said free ends are then bent over each leg 6 of the said plate, thereby locking the said disk in position. The plate 5 is then screwed home against the nut. Any tendency of the plate to unscrew, will be prevented by the disk 10 which will roll and wedge itself between the shank 3 of the bolt 1 and the connecting portion 7 of the plate, with which parts the disk is in contact when in properly-adjusted position. In order to unlock the said nut, it is only necessary to disengage the free ends 13 of the flexible strip 11 from the legs 6 and push the same with the disk 10 downwardly from engagement with the shank 3. The same can then be readily removed and the plate 5 unscrewed.

It will also be noted that because of the fact that the disk 10 engages the shank 3 of the bolt between the threads, all danger of mutilating any of the threads is avoided.

What I claim is:—

1. A nut-lock comprising a substantially U-shaped plate having its legs provided with alined threaded openings to screw upon a bolt, the bend of the plate being arranged on an inclination, and a disk adapted to be inserted between the legs of the plate and fit between the bend and the bolt and being of a diameter greater than the distance between said bend and said bolt, whereby it is caused to contact with both parts, and means for holding the disk in this position with its peripheral edge between two of the threads of the bolt.

2. A nut-lock comprising a substantially U-shaped plate having threaded openings respectively formed in the legs thereof for engagement with a bolt, a disk adapted to engage the bend of the plate and the bolt and thereby lock the plate against backward movement, and means for holding the said disk in its operative position.

3. A nut-lock comprising a substantially U-shaped plate having threaded openings respectively formed in the legs thereof for engagement with a bolt, a disk adapted to engage the bend of the plate and the bolt and thereby lock the plate against backward movement, and means for inserting the disk between the legs of the plate and holding the same in its operative position.

4. A nut-lock comprising a substantially U-shaped plate having threaded openings respectively formed in the legs thereof for engagement with a bolt, a disk adapted to engage the bend of the plate and the bolt and thereby lock the plate against backward movement, and a flexible metallic strip doubled upon itself to form a loop adapted to support the disk, the free ends of the strip adapted to be bent over the edges of the plate for holding the disk in its operative position.

5. In a nut-lock, comprising a U-shaped plate having threaded and alined openings respectively formed in the legs thereof and spaced from the bend of the plate, the said bend being arranged at an inclination with respect to the free ends of the plate, a metallic disk having a greater diameter than the distance between the bolt and the bend of the plate, and a flexible metallic strip doubled upon itself to form a loop adapted to support the said disk and arranged between the legs and the bend of the plate and the bolt, the free ends of the said strip being adapted to be respectively bent over the edges of the legs of the plate for holding the disk in engagement with the bolt and the bend of the plate.

In testimony that I claim the foregoing as my own, I have hereto affixed my signature in the presence of two witnesses.

PARIS R. HINKLE.

Witnesses:
JAMES E. LEAKE,
ALEXANDER M. AGGELER.